Patented Sept. 2, 1930

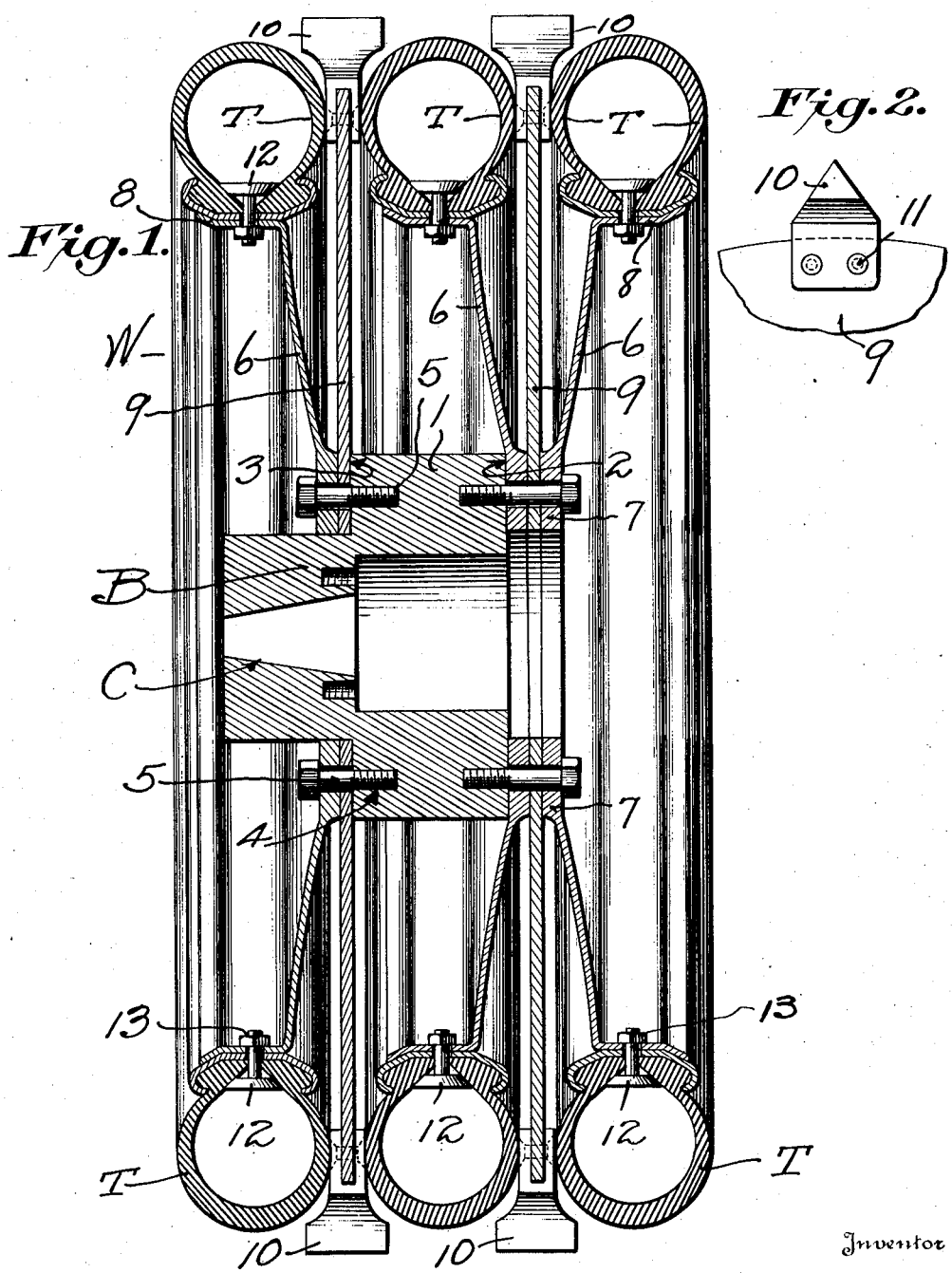

1,775,008

UNITED STATES PATENT OFFICE

ROY MARVIN WATERS, OF HAINES CITY, FLORIDA, ASSIGNOR OF ONE-HALF TO JOHN L. MYERS, OF SEBRING, FLORIDA

TRACTOR WHEEL

Application filed December 30, 1927. Serial No. 243,715.

This invention relates to wheels for tractors and the like.

A primary object is to provide an improved construction that involves a hub for supporting a plurality of rim carrying disk wheels arranged in a novel manner to produce a wide tread, particularly adapted to travel on sandy, soft, or loose soils, thereby greatly increasing the efficiency of the tractor on lands of this sort.

A further object of the invention is to provide a wheel construction that may be readily assembled from standard and readily available parts, and which permits of the use of a spiked grouser wheel to insure against slipping. In that connection the invention aims to provide an arrangement whereby the torque of the grouser wheel is borne by the hub of the wheel and not by the rim or tread portion thereof, thereby positively insuring maximum tractive effort and relieving the rim portion of undue strain.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which Fig. 1 is a vertical sectional view of a wheel constructed in accordance with the present invention.

Fig. 2 is a detail side elevation of one of the spade lugs used on the grouser wheel.

Similar reference characters designate corresponding parts throughout the several figures of the drawings.

In carrying the invention into effect it is proposed to provide a wheel construction that may be readily adapted to the axle of any standard type tractor, and to that end it is proposed to provide a special hub designated generally as B, the same constituting a part of the novel composite wheel structure, designated generally as W.

The said hub B is provided with an axle receiving portion C for receiving the splined end of the axle and is adapted to be held locked to the axle by any suitable and convenient means. The body of the hub is provided with a central body portion 1 which presents the opposite bolting face 2 and inset shoulder portions. The said face 2 and shoulder 3 of the portion 1 are both provided with tapped sockets 4 adapted to receive fastening bolts 5 for securing one or more disk wheels 6 to the hub.

The disk wheels 6 are preferably of a standard type now in general use and include an attaching or bolting portion 7 and an offset rim portion 8, the body of the wheel being somewhat conical so that by reversing a pair of the disks as shown with relation to the bolting face 2 of the hub, two rim portions may be disposed in proper spaced relation although the hub portions are in substantially touching relation except for the intermediate grouser wheel 9 which is included as a part of the wheel assembly. The opposite shoulder 3 of the hub is adapted to receive another one of the disk wheels 6 with the grouser wheel 9 clamped between the same and the shoulder.

The grouser wheels 9 are preferably in the form of flat metallic disks of suitable diameter and have at their outer edges or peripheries the spade lugs or spikes 10, the same being riveted or otherwise fastened thereto as indicated at 11. The central or hub portion of the grouser disks 9 are secured to the hub by the same fastenings 5 which unite the disk wheels with the hub and thereby carry the full torque of the pulling load directly to the hub independently of the rim portions 8 of the disk wheels. In addition to having the advantage of providing for positive tractive effort in a forward or backward direction, these grouser wheels also serve to prevent sidewise slipping of the tractor to which the wheel construction is applied.

The rim portions 8 are equipped with airless tires T or shoes which become compressed and flatten out under weight of the tractor. In that connection it is one of the features of the invention to provide for using old pneumatic tires without air by mounting the same on the rims 8 and locking them against slipping by the clamp bolts or fastenings 12. These fastenings project through the rim to receive the nuts 13, and when securely fastened in position stop creeping of the airless tires on the rims and thus prevent the same from coming off under the traveling movement of the wheel.

From the foregoing it will be apparent that the present invention provides a wheel including a hub about and to which a plurality of disk wheels may be assembled and secured in combination with intervening grouser wheels, thereby to provide a tractor wheel having a maximum width tread using deflated pneumatic tires in combination with grouser wheels having spade lugs or spikes thereon for increasing traction.

Without further description it is thought that the features and advantages of the invention will be readily apparent to those skilled in the art, and it will of course be understood that changes in the form, proportion and minor details of construction may be resorted to, without departing from the spirit of the invention and scope of the appended claim.

I claim:—

A wheel construction for use on soft earth or sand, including in combination, a hub, a pair of disc wheels of substantially frusto-conical form secured to one side of the hub, a single disc wheel also of substantial frusto-conical form secured to the other side of the hub, grouser wheels arranged between the disc wheels, rims mounted on the wheels, airless pneumatic casings carried by the rims and spade lugs carried by the peripheries of the grouser wheels and projecting beyond the treads of the tires.

In testimony whereof I hereunto affix my signature.

ROY MARVIN WATERS.